United States Patent [19]

Myerly et al.

[11] Patent Number: 4,797,501

[45] Date of Patent: Jan. 10, 1989

[54] SILICONE-BASED STABILIZERS USEFUL IN THE PREPARATION OF IMPROVED POLYURETHANE FOAMS

[75] Inventors: Richard C. Myerly; Michael W. Jorgenson, both of Charleston; Frank E. Critchfield, South Charleston, all of W. Va.

[73] Assignee: Union Carbide Corporation, Danbury, Conn.

[21] Appl. No.: 107,343

[22] Filed: Oct. 13, 1987

Related U.S. Application Data

[63] Continuation-in-part of Ser. No. 948,000, Dec. 31, 1986, abandoned.

[51] Int. Cl.$^4$ .............................................. C08G 18/14
[52] U.S. Cl. .................................................... 556/445
[58] Field of Search .......................................... 556/445

[56] References Cited

U.S. PATENT DOCUMENTS

| | | | |
|---|---|---|---|
| 28,715 | 2/1876 | Stamberger | 260/532 |
| 29,118 | 1/1877 | Stamberger | 260/2.5 |
| 3,418,354 | 12/1968 | Wheeler, Jr. | 260/448.2 |
| 3,471,588 | 10/1969 | Kanner et al. | 260/827 |
| 3,555,109 | 1/1971 | Getson | 260/825 |
| 3,560,544 | 2/1971 | Haluska | 260/448.2 |
| 3,573,334 | 3/1971 | Wheeler, Jr. | 260/448.2 |
| 3,631,087 | 12/1971 | Lewis et al. | 260/448.2 |
| 3,652,639 | 3/1972 | Pizzini | 260/465.4 |
| 3,663,649 | 5/1972 | Wheeler, Jr. | 260/827 |
| 3,674,891 | 7/1972 | Wheeler, Jr. | 260/827 |
| 3,694,478 | 9/1972 | Adams et al. | 260/448.2 |
| 3,776,857 | 12/1973 | Evanston | 252/308 |
| 3,776,875 | 12/1973 | Getson | 260/312 |
| 3,823,201 | 7/1974 | Pizzini et al. | 260/861 |
| 3,850,861 | 11/1974 | Fabris et al. | 260/2.5 |
| 4,148,840 | 8/1979 | Shah | 260/859 |
| 4,166,078 | 8/1979 | Getson | 528/26 |
| 4,208,314 | 6/1980 | Priest et al. | 260/33.2 |
| 4,358,560 | 11/1982 | Powers et al. | 524/468 |
| 4,369,300 | 1/1983 | Carter et al. | 528/28 |
| 4,376,185 | 3/1983 | Alberts et al. | 525/29 |
| 4,444,946 | 4/1984 | Alberts et al. | 525/29 |
| 4,454,255 | 6/1984 | Ramlow et al. | 521/137 |
| 4,458,038 | 7/1984 | Ramlow et al. | 521/137 |
| 4,460,715 | 7/1984 | Hoffman et al. | 521/137 |
| 4,463,127 | 7/1984 | Alberts et al. | 524/731 |
| 4,515,979 | 5/1985 | Otsuki et al. | 556/445 |

FOREIGN PATENT DOCUMENTS

| | | |
|---|---|---|
| 101494 | 7/1972 | Japan. |
| 52-80919 | 6/1977 | Japan. |
| 1126025 | 10/1966 | United Kingdom. |
| 1272181 | 1/1970 | United Kingdom. |
| 1169605 | 5/1970 | United Kingdom. |

*Primary Examiner*—Maurice J. Welsh
*Attorney, Agent, or Firm*—Paul W. Leuzzi

[57] ABSTRACT

This invention relates to silicon-based polymer/polyol stabilizers, processes for their manufacture and polyurethane foams containing these stabilized polymer polyols.

9 Claims, No Drawings

SILICONE-BASED STABILIZERS USEFUL IN THE PREPARATION OF IMPROVED POLYURETHANE FOAMS

This application is a continuation-in-part of U.S. Ser. No. 948,000 filed Dec. 31, 1986, now abandoned.

BACKGROUND OF THE INVENTION

1. Field of the Invention

This invention relates to stabilizers, polymer/polyol compositions containing said stabilizers, processes for their manufacture, and to polyurethane foams containing such stabilized polymer/polyol compositions. More particularly, the instant invention relates to stabilizers containing siloxy moieties.

2. Description of the Prior Art

Polymer/polyol compositions suitable for use in producing polyurethane foams, elastomers and the like are known materials. The basic patents in the field are Stamberger Re. 28715, (reissue of U.S. Pat. Nos. 3,383,351) and Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to, for example, polyurethane foams and elastomers produced therefrom, higher load bearing properties than are provided by the corresponding unmodified polyols.

The polymer/polyol compositions that found initial commercial acceptance were primarily compositions produced using acrylonitrile. Many of these compositions were somewhat higher in viscosity than desired in some applications. More recently, polymer/polyol compositions produced from acrylonitrile styrene monomer mixtures have been used commercially.

Polyurethane foams made with polymer/polyols are widely utilized. The two major types of foam are generally termed slabstock and molded. More particularly, slabstock foams employing polymer/polyol compositions are used in the carpet, furniture and bedding industries. One primary use of slabstock foam is as carpet underlay.

In the molded foam area, the primary type of foam employed is generally termed high resiliency (HR) molded foam. HR molded foams have been widely used in the automotive industry for applications ranging from molded seats to energy absorbing padding and the like.

The wide demand for polymer/polyols has spawned a number of trends that have created the need for additional technology. For example, the general trends is to provide slabstock foams that are virtually scorch free, i.e.—white foam products. Indeed, the desire is to provide techniques capable of producing, without substantial economic penalty, virtually scorch free foams at ever decreasing densities (viz.—1.5 pounds per cubic foot or less) while maintaining satisfactory load bearing and other foam properties.

Such scorch free foams have been obtained by utilizing relatively high styrene contents (e.g. about 65 to 70 percent styrene) in the acrylonitrile-styrene monomer mixture. The utilization of such high styrene monomer mixtures in the molded foam area is also widespread.

The preparation of polymer/polyols from such high styrene monomer mixtures creates difficulties. More particularly, such difficulties arise due to the state of the art to which polyurethane production has now advanced. There is now concern over the degree of the stability of polymer/polyol compositions or, in other words, the ability of the high solids containing materials to avoid settling. Many applications require somewhat rigorous stability characteristics, and such characteristics become more difficult to achieve when high styrene monomer mixtures are employed.

A further trend is the desire to provide foams with ever-increasing load bearing characteristics for many applications. This is particularly prevalent in the slabstock area where many formulations require the use of "neat" polymer/polyols, i.e.—the polymer/polyol is employed without dilution with conventional polyols. While typically not used neat in the molded foam area, polymer/polyols capable of imparting higher and higher load bearing characteristics to such foams are likewise desired.

Such increased load bearing characteristics are being obtained by increasing the polymer or solids content of the polymer/polyol. Solids contents of 35 to 40 weight percent or even more are accordingly desired. Preparing such high solids content polymer/polyols with the degree of stability often desired becomes substantially more difficult as the solids content is increased.

The trend toward the use of high styrene monomer mixtures and high solids content polymer/polyols has likewise resulted in polymer/polyols sometimes having higher than desired viscosities. The viscosity of a polymer/polyol must, of course, be sufficiently low to allow ease in handling during manufacture. Moreover, the viscosity must allow ready transport, handling and, ultimately, adequate processability in the foam processing equipment being utilized. The viscosity level is becoming of acute concern in the molded and slab form areas due to the sophisticated mixing systems, such as impingement systems, that are increasingly being utilized. There is a clear need to provide the desired polymer/polyols with as low a viscosity as possible.

Also, the degree of stability of the polymer/polyol, as alluded to previously, is of concern. At one time, there was not much concern for the seediness or filterability of polymer/polyols in actual commercial practice. However, the state of the art of polyurethane production has now advanced to the point where these considerations are very important in many applications. This is particularly important in the molded foam area.

Thus, the development of sophisticated, high-speed and large volume equipment, machines and systems for handling, mixing and reacting polyurethane forming ingredients has created the need for highly stable and low viscosity polymer/polyols. Polymer/polyols must accordingly meet certain minimum requirements in order to be capable of being satisfactorily processed in the sophisticated foam equipment now used. Typically, the prime requirement is that the polymer/polyols possess sufficiently small particles so that filters, pumps and the like do not become plugged or fouled in relatively short periods of time.

Since the basic development by Stamberger, a substantial amount of effort has been devoted to providing improved polymer/polyols and to improved preparation techniques. For example, U.S. Pat. No. 4,208,314 to Priest et al. discloses low density water blown polyurethane foams having the necessity of additional mixing to insure uniformity. These foams contain polymer/polyols made from acrylonitrile styrene monomer mixtures. These polymer/polyols can be converted to low-density, polyurethanes exhibiting reduced scorch, especially when the acrylonitrile to styrene ratio is relatively low. The Priest et al. patent also provides a process for making polymer/polyols whereby the particulate nature of the polymer portion of the product is considerably improved, compared to polymer/polyols prepared by prior processes. The improved process provided by Priest et al. includes, in general, maintaining a low monomer to polyol concentration throughout the reaction mixture during the polymerization.

A further improvement in the formation of polymer/polyols was provided by U.S. Pat. No. 4,148,840 to Shah. This discloses a process for producing highly stable and filterable polymer/polyol compositions by polymerizing the monomer or monomers in situ in a polyol mixture that includes a minor amount of preformed polymer/polyol.

It has been recognized that the stability of polymer/polyols is facilitated by the presence of a minor amount of a graft or addition copolymer which is formed in situ from growing polymers chains and polyol molecules. Some prior approaches have thus been directed to incorporation of unsaturation into the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Pat. No. 1,126,025 and Japanese Pat. Nos. 52-80919 and 48-101494 all utilize this approach.

In a similar vein, the use of what may be termed "stabilizer precursors" has been proposed. More specifically, the concept is to carry out the preparation of the polymer/polyol in the presence of a suitable amount of the stabilizer precursor, which precursor comprises what has been termed a "macromer" that contains a particular level of reactive unsaturation. The belief is that, during polymerization in the preparation of the polymer/polyol, adequate amounts of stabilizer will be formed by the addition polymerization of the precursor stabilizer with a growing polymer chain. The concept of using stabilizer precursors in the polymerization is a well recognized and old technique as discussed in "Dispersion Polymerization in Organic Media", edited by K. E. J. Barret, John Wiley & Sons, copyright 1975. U.S. Pat. Nos. 4,454,255 and 4,458,038 are recent examples utilizing this technique. The macromer in the '255 and '038 patents may be obtained by reacting a polyol with a compound having reactive ethylenic unsaturation such as, for example, maleic anhydride or fumaric acid. A further example of the use of this technique is U.S. Pat. No. 4,460,715. The reactive unsaturation in the '715 stabilizers is provided by an acrylate or methacrylate moiety.

The use of silicones in stabilizing materials has been reported in the literature.

Cameron and Chisholm describe the production of dispersions of styrene in benzene using a stabilizer comprising poly(dimethylsiloxane) coupled with a methacrylate group (Polymer, 1985, Vol. 26, pp. 437–442). These stabilizers would not be useful in the production of polymer dispersions in polyols however, as they would be immiscible.

U.S. Pat. No. 3,560,544 discloses the production of surfactants from the reaction of silicone polyols and polybasic acid anhydrides. U.S. Pat. No. 4,369,300 discloses the use of silicone polyols and hydroxyethyl methacrylate in the production of radiation curable coating compositions.

U.S. Pat. Nos. 3,555,109, 3,631,087, 3,694,478, 3,776,857 and 4,166,078 relate to the preparation of dispersions of copolymers in hydroxy-terminated polysiloxanes. These dispersions are said to be stabilized by grafting of the copolymer to the polysiloxane through silicon bound methyl groups.

U.S. Pat. Nos. 4,376,185, 4,444,946 and 4,463,127 disclose copolymer dispersions containing polysiloxane derived components. These components, however, lack miscibility necessary for application with polyols and therefore would not be useful in the applications described herein.

U.S. Pat. No. 4,358,560 discloses the preparation of dispersions of isobutylene and isoprene in solvents, such as methylene chloride. Stabilizing agents consist of block copolymers, preferably of polystyrene and polydimethylsiloxane.

U.S. Pat. No. 3,418,354 discloses the preparation of graft copolymers of styrene and polyxyalkylenes in the presence of peroxide catalysts. Silicone polyol compositions are disclosed. The products may be used as surfactants in aqueous systems, as polyols in the manufacture of polymethanes and as lubricants.

U.S. Pat. No. 3,471,588 discloses graft copolymers of olefins, such as styrene, and silicone polyols. The products are described as clear haze-free liquids or solids. Among other uses suggested are foam stabilizers in making urethane foams.

In U.S. Pat. No. 3,573,334 discloses vinyl modified siloxane fluids which are grafted to polyoxyalkylene monoethers with peroxide catalysts. The products are liquids which are useful as stabilizers in the making of polyurethane foams.

U.S. Pat. No. 3,663,649 discloses graft copolymers of vinyl siloxanes and polyethylene waxes. In one example the polyethylene wax is modified with maleic anhydride to give a product containing succinic anhydride residues. The products are useful as surfactants in olefin polymers.

U.S. Pat. No. 3,674,891 discloses olefinic siloxanes which are grafted to organic polymers such as hydrocarbons, polyacrylates, etc. The materials are said to be useful lubricants and leveling agents.

Polymer/polyol compositions should possess a high solids content to ensure that the polyurethane manufactured therefrom exhibits the required physical properties. However, from a manufacturing standpoint, the appreciable increases in the viscosity of polymer/polyol which often accompany increased solids content are unacceptable.

OBJECTS OF THE INVENTION

Accordingly, it is a primary object of the present invention to provide a stabilizer and an improved polymer/polyol composition containing said stabilizer.

A further object of this invention provides an improved polymer/polyol composition having a high solids content while possessing a relatively low viscosity.

A still further object of this invention provides relatively high solids polymer/polyol compositions capable of being converted to polyurethane products which exhibit superior load-bearing characteristics.

These and other objects of the invention will be apparent from the description of the invention set forth hereinafter.

SUMMARY OF THE INVENTION

This invention provides stabilizers, polymer/polyol compositions containing said stabilizers, processes for their manufacture and to polyurethane materials containing such polymer/polyol compositions.

More particularly, this invention provides polymer/polyol stabilizers of the general formula

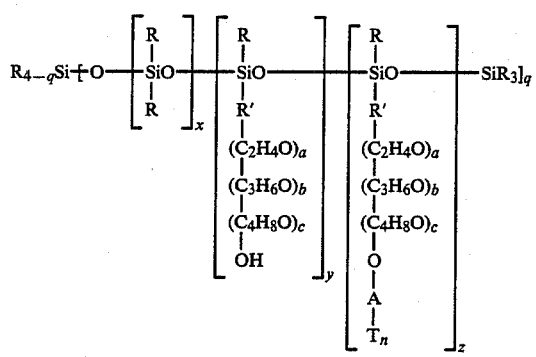

wherein R is an alkyl group having from 1 to about 4 carbon atoms; R' is an alkylene group having from about 3 to about 6 carbon atoms; a is an integer having a value of from 0 to about 100; b is an integer having a value of from 0 to about 100; c is an integer having a value of from 0 to about 100; the sum of a+b+c is at least 5; the values of a, b and c may be the same or different within different y and z groups; q is an integer having a value of from 0 to 3; x is an integer having a value of from 0 to about 200; z has a value of from about 0.2 to about 3.0; the sum of y and z has a value of from about 3 to about 50; A is a reactive unsaturated group, and T is an alkylene oxide group, and n is an integer having a value of from 0 to about 3.

These stabilizers are derived from compounds of the formula

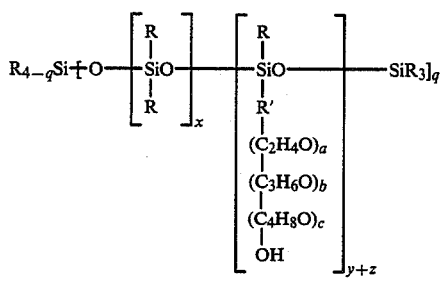

(I)

wherein R is an alkyl group having from 1 to about 4 D carbon atoms; R' is an alkylene group having from 3 to 6 carbon atoms; a is an integer having a value of from 0 to about 100; b is an integer having a value of from 0 to about 100; c is an integer having a value of from 0 to about 100; the values of a, b and c may be the same or different within different y and z groups; the sum of a+b+c is at least 5; q is an integer having a value of from 0 to 3; x is an integer having a value of from 0 to about 200; and the sum of y and z has a value of from about 3 to about 50. The ethylene oxide, propylene oxide and butylene oxide moieties may be present in random or block fashion. The values of a, b and c may be the same or different in each of the polyether pendant chains. The compounds described above are then reacted with a reactive unsaturated compound, such as maleic anhydride, and, optionally, an alkylene oxide. The resulting maleate groups may then, optionally, be isomerized before use.

The invention further relates to polymer/polyols compositions containing said stabilizers and polyurethane materials containing such polymer/polyol compositions.

Polymer/polyol composition containing the above described stabilizers exhibit low viscosities and favorable particle size/viscosity relationship. Moreover, both free rise and molded foams prepared with the polymer/polyols of the instant invention exhibit superior load bearing properties.

DETAILED DESCRIPTION OF THE INVENTION

In accordance with the present invention, polymer/polyol stabilizers of the following general formula are provided:

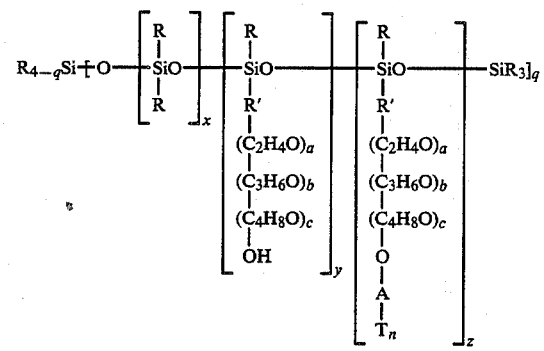

wherein R is an alkyl group having from 1 to about 4 carbon atoms; R' is an alkylene group having from about 3 to about 6 carbon atoms; a is an integer having a value of from 0 to about 100; b is an integer having a value of from 0 to about 100; c is an integer having a value of from 0 to about 100; the sum of a+b+c is at least 5; the values of a, b and c may be the same or different within different y and z groups; q is an integer having a value of from 0 to 3; x is an integer having a value of from 0 to about 200; z has a value of from about 0.2 and about 3.0; the sum of y+z has a value of from about 3 to about 50; A is a reactive unsaturated group, T is an alkylene oxide group, and n is an integer having a value of from 0 to about 3.

In a preferred embodiment, R is a methyl group, R' is an alkylene group having 3 or 4 carbon atoms; a is an integer having a value of from about 3 to about 10; b is an integer having a value of from about 10 to about 40; c is an integer having a value of 0 to about 5; q is 1; x is an integer having a value of from 0 to about 40; and the sum of y+z has a value of from about 5 to about 25; A is selected from the group consisting of maleate and fumarate groups, T is selected from the group consisting of ethylene oxide, propylene oxide and mixtures thereof and n is an integer having a value of from 0 to about 3.

In a most preferred embodiment, R is a methyl group, R' is an alkylene group having 3 carbon atoms; a is an integer having a value of from about 3 to about 10; b is an integer having a value of from about 10 to about 40; q is 1; x is an integer having a value of from 0 to about 20; the sum of y+z has a value of from about 5 to about 25; A is selected from the group consisting of maleate and fumarate groups, T is selected from the group consisting of ethylene oxide, propylene oxide and mixtures thereof and n is an integer having a value of from 0 to about 2.

These stabilizers are derived from siloxane compounds of the formula

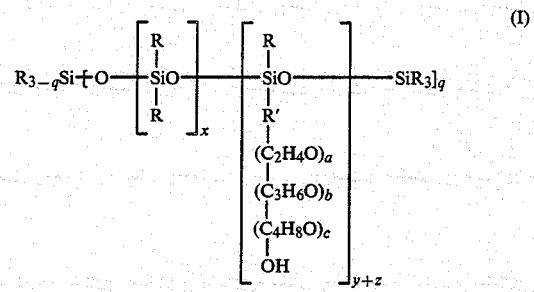

(I)

wherein R is an alkyl group having from 1 to about 4 carbon atoms; R' is an alkylene group having from 3 to 6 carbon atoms; a is an integer having a value of from 0 to about 100; b is an integer having a value of from 0 to about 100; c is an intger having a value of from 0 to about 100; the values of a, b and c may be the same or different within different y and z groups; the sum of a+b+c is at least 5; q is an integer having a value of from 0 to 3; x is an integer having a value of from 0 to about 200; and y+z has a value of from about 3 to about 50. The ethylene oxide, propylene oxide and butylene oxide moieties may be present in random or block fashion. The values of a, b and c may be the same or different within each of the polyether chains.

The silicone portion of the compounds of formula (I) is prepared by equilibrating mixtures of siloxanes and silanes, and is well known as evidenced by the disclosure of U.S. Pat. Nos. 2,491,843 and 2,595,890, Noll, W., "Chemistry and Technology of Silicones"; Academic Press: New York, 1968 (pp. 222-224) and U.K. Pat. No. 922,377.

The compounds produced are of the formula

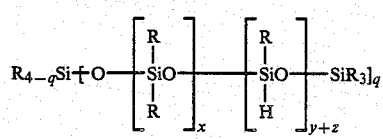

wherein R is an alkyl group having from 1 to about 4 carbon atoms; q is an integer having a value of from 0 to 3; x is an integer having a value of from 0 to about 200; and the sum of y+z has a value for from about 3 to about 50. Preferably, mixtures of hexamethyldisiloxane, dimethylsiloxane oligomer and trimethylsiloxy-poly(-methylhydrosiloxy)trimethylsilane are used, thereby producing compounds of the formula

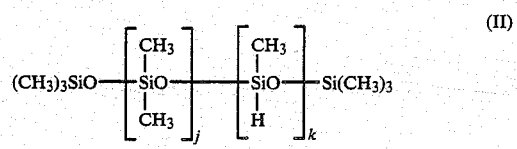

(II)

wherein j and k have average values ranging from 0 to about 100 and about 5 to about 50, respectively. Preferably, these compounds possess j and k average values ranging from 0 to about 40 and about 5 to about 25, respectively.

Typical reaction conditions include reaction temperatures of from about 0° to about 100° C., preferably about 10° to about 50° C. The reaction may be conducted at pressures ranging from about 5 to about 100 psia. Atmospheric pressure is preferably employed. Concentrated acids are usually employed as catalysts, in amounts ranging from about 1-10 wt. %. Sulfuric acid is preferred. Progress of the reaction may be followed by isolating mall portions of the reaction mixture and neutralizing the acid present therein with sodium bicarbonate.

The compounds of formula (II) are then reacted with allyl started polyoxyalkylenes to produce compounds of formula (I). The preparation of allyl started polyoxyalkylenes is also well known, as evidenced by U.S. Pat. Nos. 3,505,377 and 3,703,489. This procedure generally involves the reaction of allyl alcohol and an alkylene oxide or mixtures of alkylene oxides. Removal of the alkaline catalyst employed from the reaction products may then be accomplished with ion exchange resins.

While any alkylene oxide may be employed, ethylene oxide, propylene oxide and mixtures thereof are preferred. Most preferred, are ethylene oxide, propylene oxide mixtures containing from 1-50 wt. % of ethylene oxide.

The allyl alcohol and alkylene oxide reactants may be present in molar ratio ranging from about 1 to about 200, respectively. Preferably, the reactants are present in molar ratios ranging from about 5 to about 100, respectively. Most preferably, the reactants are present in molar ratios ranging from about 10 to about 50, respectively.

The reaction of the allyl alcohol and alkylene oxide is preferably carried out in the presence of a catalytic amount of a strong base. Suitable bases include inorganic bases such as alkali and alkaline earth metal hydroxides and the weak acid salts of alkali and alkaline earth metals, and organic bases such as quaternary ammonium hydroxides, 4-dimethylaminopyridine, 4-pyrrolidinopyridine, and imidazole. Potassium hydroxide has been found to be useful and is preferred.

Suitable reaction temperatures may vary from about 80° C. to about 130° C. Desirably, the reaction should be carried out in a reactor capable of agitation and subsequent pressurization. The product may then be cooled and stripped to remove excess alkylene oxide. Removal of the alkaline catalyst may then be accomplished through use of an ion exchange resin.

As noted above, production of compounds of the formula (I) is accomplished through the reaction of compounds of the formula (II) with the reaction product of the allyl alcohol and the alkylene oxide(s). These reaction components should be present in a molar equivalent ratio ranging from about 1 to about 1.5 respectively. Preferably, this ratio should range from about 1 to 1.3 respectively.

This reaction is preferably conducted over a platinum catalyst. The term platinum catalyst is used to define and encompass the metal platinum, supported and unsupported platinum, platinum compounds and platinum complexes. Such catalysts are well known in the art as seen for example by U.S. Pat. Nos. 2,823,218, 2,851,473 and 3,410,886. Illustrative of the above mentioned types of catalysts are platinum, platinum on alumina; platinum-on-charcoal; chloroplatinic acid, platinum black; platinum olefin; platinum cycloalkane; bis(benzonitrile) dichloroplatinum (II); and bis(phenyl butyronitrile) dichloroplatinum (II);. While obviously only a catalytic amount of platinum catalyst is necessary for the instant reaction, the amount of platinum catalyst may vary over a wide range. Generally about 5 to about 1000 parts by weight platinum catalyst per million parts by weight of total reactants is employed, while the preferred range is from about 20 to about 500 parts by weight per million parts by weight.

Suitable reaction temperatures may vary from about 50° C. to about 125° C. Desirably, the reaction should be carried out in a reactor capable of agitation and pressurization. The reaction is further typically conducted in the presence of an inert solvent such as toluene. Typically, the solvent should be present in amounts ranging from about 10 to about 90 wt. %. Preferably, solvents are present in amounts ranging from about 20 to 80 wt. %, while, most preferably, they are present in amounts of between 30 and 70 wt. %. Reaction times, of course, depend upon other variables, such as reaction temperature and catalyst concentration. Typically, reaction times vary between about 0.5 minutes and 60 minutes. An aqueous strong acid, such as 1N HCl is then added to hydrolyze the unreacted reaction product of the allyl alcohol and alkylene oxide. The strong acid is typically added in amounts of about 2.4 grams per 100 grams of the reaction mixture. The reaction mixture is then brought to reflux. A mixture of water and aldehyde (propionaldehyde when allyl alcohol was initially employed) forms as a lower layer in the trap and is periodically removed. Reflux of the reaction mixture is maintained until this layer ceases to form. The reaction is then allowed to cool. The acid present in the reaction mixture is then stripped away or neutralized through the addition of, for example, sodium bicarbonate. Following acid neutralization, the cooled product is filtered using a pressure filter.

The stabilizers are produced through a reaction between compounds of the formula (I), a reactive unsaturated compound and, optionally, an alkylene oxide. It has been found satisfactory to maintain the ratio of the reactive unsaturated compound to compound (I) in the range of from about 0.5 to perhaps about 1.5 moles of reactive unsaturated compound per mole of compound (I), more preferably 0.7 to about 1.3 mole per mole of compound (I).

By the term reactive unsaturated compound, it is meant any compound capable of forming an adduct with a hydroxy containing material, in this case compound (I), either directly or indirectly, and having carbon to carbon double bonds which are adequately reactive with the particular monomer system being utilized. More specifically, compounds containing alpha, beta unsaturation are preferred. Suitable compounds satisfying this criteria include the maleates, fumarates, acrylates, and methacrylates. While not alpha, beta unsaturated compounds, adducts formed from substituted vinyl benzenes, such as chloromethylstyrene may likewise be utilized. Illustrative examples of suitable alpha, beta unsaturated compounds which may be employed to form the stabilizer precursor include maleic anhydride, fumaric acid, dialkyl fumarates, dialkyl maleates, glycol maleates, glycol fumarates, dialkyl maleates, glycol maleates, glycol fumarates, isocyanatoethyl methacylate, methyl methacrylate, hydroxyethyl methacrylate, acrylic and methacrylic acid and their anhydride, methacroyl chloride and glycidyl methacrylate. Preferred is maleic anhydride.

The reactive unsaturated compound should be present in amounts ranging from about 0.2 to about 2.0 wt. %, preferably from 0.4 to about 1.5 wt. % based upon the weight of component (I).

When stabilizer preparation involves alkylene oxide capping, the stabilizer preparation is preferably carried out in the presence of a catalytic amount of a strong base. Suitable bases include inorganic bases such as alkali and alkaline earth metal hydroxides and the wea acid salts of alkali and alkaline earth metals, and organic bases such as quaternary ammonium hydroxides, 4-dimethylaminopyridine, 4-pyrrolidinopyridine, and imidazole. Potassium hydroxide has been found to be useful. The amount of catalyst is not critical; and may, for example, be as low as about 6 ppm or even less when potassium hydroxide is used. Generally, between about 10 and about 200 ppm of catalyst is employed.

Suitable reaction temperatures may vary from about 100° to about 125° C. Desirably, the reaction should be carried out in a reactor capable of agitation and subsequent pressurization. When acid is generated after addition of the reactive unsaturated compound, it is necessary to introduce an alkylene oxide, preferably ethylene oxide or propylene oxde, either with the other reactants or subsequently. It is reacted with the adduct until the acid number is below at least about 3.0, preferably below about 1.0. The product may then be cooled and stripped to remove excess alkylene oxide. The alkylene oxide is added in an amount of from 1 to about 10, preferably from about 1.5 to about 6 moles, per mole of reactive unsaturated compound. When the reactive unsaturated compound does not generate acid, no alkylene oxide addition is necessary.

The resulting unsaturation present in the stabilizers may then, optionally, be isomerized. For instance, when maleic anhydride is employed as the reactive unsaturated compound, the resulting maleate groups may be isomerized to fumarate groups.

While not wishing to be bound by the mechanism postulated hereinafter, it is believed that the improved properties associated with the stabilizers of the present invention may be attributed to their high molecular weight relative to stabilizers of the prior art and the improved steric barrier between polymer particles which accompanies its use. Polymer particle agglomeration is retarded, therefore causing lower viscosity of a polymer/polyol composition in which the stabilizers are present.

The polyol or blends thereof, employed depends upon the end use of the polyurethane product to be produced. The molecular weight or hydroxyl number of the base polyol may thus be selected so as to result in flexible, semi flexible, or rigid foams or elastomers when the polymer/polyol produced from the base polyol is converted to a polyurethane. The hydroxyl number of the polyol or polyols employed can accordingly vary over a wide range. In general, the hydroxyl number of the polyols employed may range from about 20 (or lower) to about 150 (and higher).

For example, when foams are to be prepared, the molecular weight or the hydroxyl number may be selected to result in flexible, semi-flexible, or rigid foams. The polyols in this instance preferably possess a hydroxyl number of at least 150 for rigid foams, from about 50 to about 150 for semi flexible foams, and from about 20 to about 70 for flexible foams. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 75.

As a further example, for elastomer applications, it will generally be desirable to utilize relatively high molecular weight base polyols having relatively low hydroxyl numbers, e.g., about 20 to about 50.

The hydroxyl number limits described above are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = number average molecular weight of the polyol.

Substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of nonreducing sugars and sugar derivatives;
(c) alkylene oxide adducts of phosphorus and polyphosphorus acid;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris (hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro 1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the base polyol. For example, amine terminated polyether polyols are known and may be utilized, if desired.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly(oxypropylene oxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

As is well known in the art, the polyols that are most preferred herein contain varying small amounts of unsaturation. Unsaturation in itself does not affect in any adverse way the formation of the polymer/polyols in accordance with the present invention except in the case where the extent or type of unsaturation is so high as to result in a highly crosslinked polymer/polyol or gel.

Polymer-polyols are well known in the art. The basic technology is disclosed in Stamberger U.S. Pat. Nos. Re. 28,715 and Re. 29,118. Generally, in order to produce a conventional polymer/polyol, an ethylenically unsaturated monomer is polymerized in situ in an appropriate polyol. The polymerization produces a stable dispersed polymer in the polyol. The polymer dispersion, known as a polymer polyol, can be employed as a reactant in a number of reactions (e.g., polyurethane forming reactions) to introduce into the resultant product, as an integral part thereof, both the polyol and the dispersed polymer.

More specifically, conventional polymer polyols may be produced by the following steps which are known in the art:

(a) dispersing an ethylenically unsaturated monomer in a polyol, and
(b) polymerizing said monomer in said polyol by free radical addition polymerization in the presence of a conventional free radical catalyst to provide a stable dispersion of polymer-polyol.

Polymer polyols may be produced by polymerizing the ethylenically unsaturated monomers in the selected polyol at a temperature of from about 40° C. to 150° C. in the presence of a catalytically effective amount of a conventional free radical catalyst known to be suitable for the polymerization of ethylenically unsaturated monomers. In batch processing, the monomers may be fed into the polyol over about three hours while maintaining the polyol at about 80°–130° C., and the reactants are then maintained about 110°–130° C. for an additional hour. In the preferred continous operation, monomer and polyol are introduced at rates which give an average residence time of about 10 to about 80 minutes, while reaction temperature is maintained in the range of about 110° C. to about 130° C.

Among the polyols that can be employed for producing polymer polyols are hydroxyl terminated polyesters, polyhydroxyalkanes, polyphenols, polyoxyalkylene polyols, or the like and the corresponding mercapto derivatives, all of which are described in more detail above.

The monomers which may be used are the polymerizable monomers characterized in that they have at least one polymerizable ethylenically unsaturated group of the type, (C=C). The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7-octadiene, alpha methylstyrene, para methylstyrene, 2,4-dimethylstyrene, ethylstyrene, isopropylstyrene, butylstyrene, phenylstyrene, cyclohexylstyrene, benzylstyrene and the like, substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl sulfide, p vinylphenyl phenyl oxide, and the like; the acrylic and substituted acrylic monomers such as acrylic acid, methacrylic acid, methylacrylate, hydroxypropyl acrylate, 2-hydroxyethyl acrylate, 2-hydroxyethyl methacrylate, methyl methacrylate, cyclohexyl methacrylate, benzyl methacrylate, isopropyl methacrylate, hydroxypropyl methacrylate, octyl methacrylate, methacrylonitrile, methyl alpha chloroacrylate, ethyl alpha ethoxyacrylate, methyl alpha acetamidoacrylate, butyl acrylate, 2-ethylhexyl acrylate, phenyl acrylate, phenyl methacrylate, acrylonitrile, alpha chloroacrylo nitrile, substituted acrylamides including N,N-dimethylacrylamide, N,N-dibenzylacrylamide, and methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl chloride, vinyl bromide, vinyl fluoride, vinylidene bromide, 1-chloro 1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 2,4-dihydro-1,2-pyran, 2-butoxy-2-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N vinyl pyrrole, and the like; dimethyl fumarate, dimethyl maleate, maleic acid, crotonic acid, fumaric acid, itaconic acid, t-butylaminoethyl methacrylate, dimethylaminoethyl methacrylate, glycidyl acrylate, allyl alcohol, glycol monoesters of itaconic acid, diglycol esters of itaconic acid, methyl monoester of itaconic acid, dichloro- butadiene, vinyl pyridine, and the like. Any of the known polymerizable monomers can be used and the compounds listed above are illustrative and not restrictive of the monomers suitable for use in this invention. Preferably, styrene, acrylonitrile and vinylidene chloride are the monomers used.

Illustrative of catalysts which can be used in producing polymer-polyols are the well-known free radical types of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, t-butyl peroxybenzoate, alpha,alpha'-azo 2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azo-bisisobutyronitrile, persuccinic acid, diisopropyl peroxy dicarbonate, and the like. A mixture of catalysts may also be used.

The concentration of the catalyst can vary from about 0.001 to about 5 percent, preferably from about 0.2 to about 1.0 percent. However, any effective catalytic amount is satisfactory.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, and N,N-dimethylacetamide.

Acceptable polymer-polyols normally have an average polymer particle size ranging from about 1 to about 6 microns; preferably, from about 1 to about 3 microns; and most preferably, about 1 micron to about 2 microns. Polymer-polyols having particles of maximum diameter of less than 1 micron are considered for the purposes of this invention to be on the borderline of invisibility when examined under a microscope. Polymer-polyols having particles of 1–3 microns maximum diameter are considered to be of medium size. Polymer-polyols having particles of 4–6 microns maximum diameter are considered to be of large size.

Polymer-polyols should contain from about 5 to 60% by weight of dispersed polymer. A preferable concentration is about 20 to 50% by weight. Polymer-polyols having in excess of about 60% by weight of dispersed polymer are ordinarily too viscous for practical purposes.

The stabilizers may be used in conjunction with the above-described polymer/polyols in amounts ranging from about 0.5 g to about 15 g of stabilizer per 100 g of polymer/polyol. Preferably, the stabilizer is present in amounts ranging from 1.0 g to 10 g moles per 100 g of polymer/polyol.

The stabilized polymer-polyols can be used to produce polyurethane products, particularly polyurethane foams as described below.

Polyurethane Preparation

The present invention also provides a method for producing polyurethane products which include reacting: (a) a polymer/polyol composition of this invention made with the stabilizer, and (b) an organic polyisocyanate in the presence of (c) a catalyst for the reaction of (a) and (b) to produce the polyurethane product. When a foam is being prepared, the reaction is carried out in the presence of a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end use application. Blends in which the resulting polymer content is as low as 4 percent of the total weight of the blend, or even less, are useful.

The organic polyisocyanates that are useful in producing polyurethane products in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato 2,2-dimethylpentane, 1,6-diisocyanato 3-methoxyhexane, 1,8-diisocyanatooctane, 1,5-diisocyanato-2,2,4-trimethylpentane, 1,9-diisocyanatononane, 1,10-diisocyanatodecane, 1,11-diisocyanatoundecane, 1,12-diisocyanatododecane, bis(isocyanatohexyl) sulfide, 1,4-diisocyanatobenzene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate, 3,3'-diphenyl-methylene diisocyanate, and polymethylene poly (phenyleneisocyanates), and mixtures thereof.

The preferred polyisocyanate is a mixture of 80% 2,4-tolylene diisocyanate and 20%, 2,6-tolylene diisocyanate.

Any known catalysts useful in producing polyurethanes may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N-N-dimethylethanolamine, N,N,N',N'-tetramethyl -1,3-butanediamine, triethanolamine, 1,4-diazabicyclo-[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin bis(4-methylaminobenzoate), dibutyltin bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide) dibutyltin-bis(2- dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product to be formed is a polyurethane foam, a small amount of a blowing agent is employed in the reaction mixture. Suitable blowing agents, for example, include water from bout 0.5 to about 5 weight percent, based upon total weight of the polymer/polyol composition, or other suitable blowing agents which are vaporized by the exotherm of the reaction, or a combination of water and the other blowing agent. Illustrative polyurethane blowing agents include halogenated hydrocarbons such as trichloromono-fluoromethane, dichlorodifluoromethane, dichloromonofluoromethane, dichloromethane, trichloromethane, 1,1-dichloro 1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, and the like. The generally preferred method of foaming for producing flexible foams is the use of water, or a combination of water plus a fluorocarbon blowing agent such as trichloromonofluoromethane. The quantity of blowing agent employed will vary with factors such as the density desired in the foamed product.

The scorch-free properties of the foams produced using polymer/polyol compositions are most evident when at least some of the blowing agent is water, and the water is used in an amount that results in a foam having a density less than 3.0 pounds per cubic foot. Generally, the use of water in an amount of about 2.0 percent by weight, based on the total weight of the polymer/polyol composition, results in a foam having a density of less than 3.0 pounds per cubic foot.

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Patent Specification No. 1,220,471. The latter class of copolymers differs from the above mentioned polysiloxane-polyoxyalkylene block copolymers in that the polysiloxane moiety is bonded to the polyoxy alkylne moiety through direct carbon-to silicon bonds, rather than through carbon-to oxygen to silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

The polyurethanes so produced may be utilized in foam and elastomer applications where any conventional type of polyurethane is or can be utilized. The polymer/polyol compositions of this invention find particular utility in the production of high resiliency foams for use in arm rests, mattresses, automobile seats, and the like, as well as in slabstock foams for use as carpet underlayment, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviations have the following meanings:

Polyol A—A polyol made by reacting propylene oxide and ethylene oxide with glycerol in the presence of potassium hydroxide catalyst and refining to remove catalyst. The polyol contains about 10 weight percent ethylene oxide as an internal block and has hydroxyl number of about 52.

Polyol B—A polyol made by reacting propylene oxide and ethylene oxide successively with glycerol in the presence of potassium hydroxide catalyst and refining to remove catalyst. The polyol contains about 16.5 weight percent ethylene oxide as a cap and has a hydroxyl number of about 28.

Polyol C—A polyol made by reacting propylene oxide and ethylene oxide with glycerol in the presence of potassium hydroxide catalyst and refining to remove catalyst. The polyol contains about 15 weight percent ethylene oxide as an end block and has hydroxyl number of about 35.

Polyol D—A polyol made by reacting propylene oxide and ethylene oxide with sorbitol in the presence of potassium hydroxide catalyst and refining to remove catalyst. The polyol contains about 10 weight percent ethylene oxide as an internal block and has hydroxyl number of about 28.

Polyol E—A polyol made by reacting propylene oxide and ethylene oxide with glycerol in the presence of potassium hydroxide catalyst and refining to remove catalyst. The polyol contains about 8 weight percent ethylene oxide as an internal block and has hydroxyl number of about 56.

Allyl Polyether A (AP-A)—A polyether made by reacting propylene oxide and ethylene oxide with allyl alcohol in the presence of potassium hydroxide catalyst and refining to remove catalyst. The polyether contains about 75% ethylene oxide which was cofed with the propylene oxide and has an allyl equivalent weight of 750.

Allyl Polyether B (AP-B)—A polyether made by reacting propylene oxide and ethylene oxide with allyl alcohol in the preseence of potassium hydroxide catalyst and refining to remove catalyst. The polyether contains about 40% ethylene oxide which was cofed with the propylene oxide and has an allyl equivalent weight of 4600.

Allyl Polyether C (AP-C)—A polyether made by reacting propylene oxide and ethylene oxide with allyl alcohol in the presence of potassium hydroxide catalyst and refining to remove catalyst. The polyether contains about 40% ethylene oxide which was cofed with the propylene oxide and has an allyl equivalent weight of 1600.

Allyl Polyether D (AP-D)—A polyether made by reacting propylene oxide and ethylene oxide with allyl alcohol in the presence of potassium hydroxide catalyst and refining to remove catalyst. The polyether contains about 70% ethylene oxide which was cofed with the propylene oxide and has an allyl equivalent weight of 770.

Allyl Polyether E (AP-E)—A polyether made by reacting propylene oxide and ethylene oxide with allyl alcohol in the presence of potassium hydroxide catalyst and refining to remove catalyst. The polyether contains about 10% ethylene oxide which was cofed with the propylene oxide and has an allyl equivalent weight of 2000.

Allyl Polyether F (AP-F)—A polyether made by reacting propylene oxide and ethylene oxide with allyl alcohol in the presence of potassium hydroxide catalyst and refining to remove catalyst. The polyether contains about 40% ethylene oxide which was cofed with the propylene oxide and has an allyl equivalent weight of 2800.

Allyl Polyether G (AP-G)—A polyether made by reacting propylene oxide and ethylene oxide with allyl alcohol in the presence of potassium hydroxide catalyst and refining to remove catalyst. The polyether contains about 10% ethylene oxide which was cofed with the propylene oxide and has an allyl equivalent weight of 800.

Allyl Polyether H (AP-H)—A polyether made by reacting propylene oxide and ethylene oxide with allyl alcohol in the presence of potassium hydroxide catalyst and refining to remove catalyst. The polyether contains about 23% ethylene oxide which was cofed with the propylene oxide and has an allyl equivalent weight of 890.

Allyl Polyether I (AP-I)—A polyether made by reacting propylene oxide and ethylene oxide with allyl alcohol in the presence of potassium hydroxide catalyst and refining to remove catalyst. The polyether contains about 14% ethylene oxide present as an end block and has an allyl equivalent weight of 1400.

Catalyst A—A polyurethane foam amine catalyst sold as "NIAX Catalyst A-107" by Union Carbide Corporation.

Catalyst B—A mixture of 33 wt. percent 1,4-diazabicyclo[2.2.2.]octane and 67 wt. percent dipropylene glycol.

Catalyst C—A polyurethane foam amine catalyst sold as "NIAX Catalyst C-229" by Union Carbide Corporation.

Catalyst D—A polyurethane tin catalyst sold as "M&T 120" by M&T Chemical Co.

Catalyst E—A polyurethane foam amine catalyst sold as "NIAX Catalyst A-1" by Union Carbide Corporation.

Catalyst F—A polyurethane foam amine catalyst sold as "NIAX Catalyst A-33" by Union Carbide Corporation.

Catalyst G—A polyurethane tin catalyst sold as "D-19" by Union Carbide Corporation.

Catalyst H—A polyurethane foam amine catlyst sold as "D-8118" by Air Products Corporation.

Surfactant A—A silicone surfactant sold for use in high resiliency foam by Union Carbide Corporation as "Silicone Surfactant Y-10184".

Surfactant B—A silicone surfactant sold for use in polyurethane foaming by Union Carbide Corporation as "Silicone Surfactant L-6202".

AIBN—Azo-bis(isobutyronitrile).

TDI—A mixture of 80 weight percent 2,4-diisocyanatotoluene and 20 weight percent 2,6-diisocyanatotoluene.

EO—Ethylene oxide.
PO—Propylene oxide.
Density—Density in pounds per cubic foot (ASTM D-3574, Test A).
Resiliency—Resiliency in percent (ASTM D-3574, Test E).
Porosity—Porosity in CFM (ASTM D-3574, Test G).
IFD, 25%—Indentation Force Deflection, (ASTM D 3574, Test B1 and Test B2).
IFD, 65%—Indentation Force Deflection, (ASTM D 3574, Test B1 and Test B2).
IFD, 75%—Indentation Force Deflection, (ASTM D 3574, Test B1 and Test B2).
IFD, 65/25—Indentation Force Deflection, divided by Indentation Force Deflection, 25% (ASTM D 3574, Test B1 and Test B2).
CFD, 50%—Compression Force Deflection, (ASTM D 3574, Text C).

Vent Collapse—The molded foam is cut one half inch below the top surface. The diameter of the holes below the four mold vents is measured and the total reported in inches.

Organosilicone Fluid A—Similar to Polymer/Polyol A except it contains no reactive unsaturation.

Tensile—Tensile in psi (ASTM D-3574, Test E).
Elongation—Elongation in percent (ASTM D-3574, Test E).
TVTM—Too viscous to measure.
FTC—Force to crush. The uncut, uncrushed molded foam is tessted for load by the IFD, 75% test one minute after demold. The test is repeated twice at one minute intervals.

Tear—Tear Resistance in pounds per inch (ASTM D-3574, Test F).
Comp. Set, 75%—Compression Set, 75% (ASTM D-3574, Test D).
HA Load Loss, 50%—Humid Age Load Loss, 50% (ASTM D-3574, Test D).
HA Comp. Set, 50% —Humid Age Compression Set, 50% (ASTM D-3574, Test D).
Viscosity—viscosities were measured either by Brookfield viscometer (cps) or Cannon Fenske viscometer (cSt).

Filtration Hindrance (Filterability)—Filterability is determined by diluting one part by weight sample (e.g. 200 grams) of polymer/polyol with two parts by weight anhydrous isopropanol (e.g., 400 grams) to remove any viscosity-imposed limitations and using a fixed quantity of material in relation to a fixed cross-sectional area of screen (e.g., 1½in. diameter), such that all of the polymer/polyol and isopropanol solution passes by gravity through a 150-mesh or 700-mesh screen. The 150 mesh screen has a square mesh with average mesh opening of 105 microns, and it is a "Standard Tyler" 150 square-mesh screen. The 700-mesh screen is made with a Dutch twill weave. The actual screen used had a nominal opening of 30 microns. The amount of sample which passes through the screen is reported in percent, a value of 100 percent indicates that over 99 weight percent passes through the screen.

M—An abbreviation for the polysiloxane component [(CH$_3$)$_3$Si—O$_{1/2}$].

D—An abbreviation for the polysiloxane component

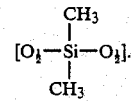

D'—An abbreviation for the substituted polysiloxane component D, namely

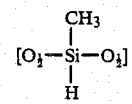

EXAMPLES

Preparation of Compounds (II)

Appropriate amounts of the following compounds were mixed together in a vessel provided with agitation, under a nitrogen atmosphere at room temperature.

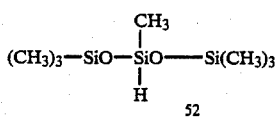
(a)

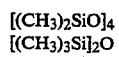
(b)

[(CH₃)₃Si]₂O (c)

Sulfuric acid (98 percent) was added in an amount equal to two percent of the total weight of the reaction mixture. The mixture was stirred for at least sixteen hours after which the agitation was stopped and the reaction mixture was allowed to settle. A bottom layer, if present, was removed through use of a pipette. Powdered sodium bicarbonate (10 grams per 250 grams of reactants) was then introduced in small amounts with stirring to neutralize the remaining acid. Stirring was continued for two hours after bubbling ceased. The product of the reaction was then pressure filtered to remove any suspended matter present.

Analysis for silanic hydrogen (SiH) was performed by measuring the infrared absorbency at 2160 cm$^{-1}$ and comparison of the result with a known concentration.

The structures of the silicone fluids A through I are set forth in Table I.

TABLE I
Silicone SiH Fluids

| SiH Fluid | Structure | SiH Eq. Wt. | % MD'52M | % D4 | % MM |
|---|---|---|---|---|---|
| A | MD40D'13M | 299 | 21.0% | 75.9% | 3.1% |
| B | MD72D'5M | 1185 | 5.5% | 92.0% | 2.5% |
| C | MD15D'12M | 164 | 38.0% | 55.7% | 6.3% |
| D | MD9D'6M | 201 | 31.6% | 56.2% | 12.2% |
| E | MD5D'24M | 85 | 75.6% | 20.0% | 4.4% |
| F | MD123D'12M | 789 | 7.6% | 91.1% | 1.3% |
| G | MD30D'12M | 272 | 24.3% | 68.0 | 7.7% |
| H | MD15D'12M | 180 | 36.8% | 51.5% | 11.7% |
| I | MD30D'24M | 166 | 39.8% | 55.7% | 4.5% |

Preparation of Compounds (I)

The compounds of the formula (II) and the allyl fluids were charged into a kettle. The kettle was equipped with a stirrer, reflux condenser and a Dean-Stark trap. The compounds of the formula (II) and the allyl fluid were present in a ratio of 1.3 equivalent of allyl fluid per equivalent of compound (II). Toluene in an amount equal to 30 weight percent of the total reaction mixture was also introduced. The reaction mixture was provided with a nitrogen atmosphere and was then heated to 80°–85° C. A solution of chloroplatinic acid (1 gram/25 grams of isopropyl alcohol) was then introduced until the platinum concentration of the reaction mixture equaled 20 ppm. An exotherm occurred and the initially cloudy reaction mixture cleared within about one minute. The elevated temperature was maintained for an additional 30 minutes to allow the reaction to further proceed. The reaction mixture was then cooled to about 90° C. whereupon aqueous 2N HCl (2.4 grams/100 grams of reaction mixture) was introduced. The reaction mixture was then brought to reflux. A mixture of water and propionaldehyde was removed as the bottom layer of distillate in the trap. The elevated temperature was maintained until this layer ceased to form. The reaction mixture was then allowed to cool. Powdered sodium bicarbonate, in an amount of about 1.7 grams per gram of HCl previously introduced, was added with stirring. The liquid product was then filtered using a pressure filter.

The data relative to the organo-silicone fluids produced through the above described procedure is set forth in Table II.

Stabilizer Precursor Preparation

The following general procedure was followed for Silicone Stabilizers A through N and for Comparative Stabilizers 1 and 2. The Organo Silicone fluid and the specified concentration of KOH (added as 50% aqueous or 90% flake) were charged to a stainless steel stirred reactor and the reactor purged with nitrogen. The mixture was heated at 80° C. followed by the addition of the maleic anhydride solid. The contents were heated to the desired temperature and either ethylene oxide or propylene oxide was added by pumping. After the prescribed reaction time, the excess oxide was removed by stripping under vacuum. The results are summarized in Table III.

Polymer/Polyol Preparation

All the example Polymer/Polyols A through AE were prepared using a single stage 550 ml backmixed continuous reactor with a 12 minute residence time. The reactor was maintained at the desired temperature and about 45 psig pressure during the startup, lineout, and product collection stages. The feeds for Polymer/Polyols A through AE are given in Table IV. The properties of the resultant Polymer/Polyols are also given.

Polymer/Polyol A shows the improvement in particle size and filtration relative to the comparative Polymer/Polyol H in which the reactive unsaturated compound is not present.

Polymer/Polyols AB, AC and AD show the improvement in filtration and viscosity realtive to the comparative Polymer/Polyol AE which does not contain the silicone fluid.

Polymer/Polyol V shows the improvement in particle size and viscosity relative to the comparative Polymer/Polyol Z.

TABLE II
Organo-Silicone Fluids

| Organo-Silicone | SiH Fluid | Amount, g | Allyl Fluid | Amount, g | OH # |
|---|---|---|---|---|---|
| A | A | 23.5% | A | 76.5% | 70 |
| B | B | 16.5% | B | 83.5% | 17.6 |
| C | B | 36.3% | C | 63.7% | 30.2 |
| D | B | 54.2% | D | 45.8% | 43.1 |
| E | C | 5.9% | E | 94.1% | 39.5 |
| F | D | 5.2% | F | 94.8% | 29.3 |
| G | E | 7.6% | G | 92.4% | 88.7 |
| H | F | 40.5% | H | 59.5% | 48.5 |
| I | G | 13.0% | I | 87.0% | 44.2 |
| J | H | 9.0% | I | 91.0% | 41.2 |
| K | I | 8.4% | I | 91.6% | 40.8 |

TABLE III

Silicone Stabilizers

| Silicone Stab. | Organo-Silicone ID | Maleic Anhydride (MA), meq/g | KOH ppm | Oxide ID | Moles oxide/mole MA | Rxn. Temp, deg C | Rxn. Time, hrs | Final Acid No. | Final Unsaturation, meq/g | Viscosity, cps, 25° C. | Retained Unsat. % |
|---|---|---|---|---|---|---|---|---|---|---|---|
| A | A | 0.1 | 39 | PO | 12 | 125 | 26 | 0.066 | 0.044 F | 1496 | 44% |
| B | B | 0.095 | 43 | PO | 12 | 125 | 20 | 0.26 | 0.043 F | 30407 | 45% |
| C | C | 0.1 | 40 | PO | 12 | 125 | 23 | 0.067 | 0.082 F | 2375 | 82% |
| D | D | 0.1 | 40 | PO | 12 | 125 | 23 | 0.061 | 0.068 F | 4772 | 68% |
| E | E | 0.095 | 30 | PO | 8.9 | 125 | 22 | 0.15 | 0.087 F | 1817 | 92% |
| F | E | 0.095 | 30 | PO | 8.9 | 125 | 22 | 0.14 | 0.086 F | 1919 | 91% |
| G | E | 0.19 | 30 | PO | 6 | 125 | 20 | 0.14 | 0.195 F | 2261 | 103% |
| H | F | 0.083 | 30 | PO | 10.3 | 125 | 22 | 1.03 | 0.09 F | 1514 | 108% |
| I | G | 0.187 | 30 | PO | 6 | 125 | 23 | 0.04 | 0.134 F | 1370 | 72% |
| J | G | 0.36 | 30 | PO | 3.8 | 125 | 24 | 0.01 | 0.208 F | 2080 | 58% |
| K | H | 0.079 | 30 | PO | 10.8 | 125 | 18 | 0.05 | 0.069 F | 993 | 87% |
| L | I | 0.061 | 120 | EO | 4.3 | 110 | 30 | 0.23 | 0.134 F | 1056 | 220% |
| M | J | 0.061 | 120 | EO | 4.8 | 110 | 35 | 0.029 | 0.041 F | 1763 | 67% |
| N | K | 0.041 | 120 | EO | 8.4 | 110 | 19 | 0.18 | 0.028 F | 2811 | 68% |
| P | Polyol C | 0.204 | 20 | EO | 5.2 | 175 | 20 | 0.08 | 0.097 F | 4063 | 48% |
| Q | Polyol D | 0.102 | 30 | PO | 6.0 | 125 | 18 | 0.04 | 0.061 F | 3100 | 60% |

TABLE IV

Polymer Polyols

| Polymer Polyol | Stab. ID | Polyol ID | Polyol | Stab. | ISOP | MeOH | STY | ACN | AIBN | Rxn Temp, deg C | Filtration, % 150-mesh | Filtration, % 700-mesh | Particle Size, microns | Viscosity, cks |
|---|---|---|---|---|---|---|---|---|---|---|---|---|---|---|
| A | A | A | 50.7% | 2.7% | 4.3% | — | 29.2% | 12.5% | 0.6% | 125 | 100% | 44% | 2.42 | TVTM |
| B | A | A | 53.3% | 1.7% | 4.7% |  | 27.8% | 11.9% | 0.6% | 125 | 100% | 15% | 3.37 | 130,000 |
| C | B | A | 52.2% | 2.7% | 4.7% |  | 27.8% | 11.9% | 0.6% | 125 | 29% | — | 2.81 | 6,136 |
| D | C | A | 52.2% | 2.7% | 4.7% |  | 27.8% | 11.9% | 0.6% | 125 | 100% | 10% | 3.94 | 3,887 |
| E | C | A | 54.4% | 0.5% | 4.7% |  | 27.8% | 11.9% | 0.6% | 125 | — | — | 5.50 | 30,720 |
| F | C | A | 54.4% | 0.5% | 4.7% |  | 27.8% | 11.9% | 0.6% | 125 | — | — | — | TVTM |
| G | D | A | 52.2% | 2.7% | 4.7% |  | 27.8% | 11.9% | 0.6% | 125 | — | — | 10.71 | 91,700 |
| H comp. | Fluid A* | A | 50.7% | 2.7% | 4.3% | — | 29.2% | 12.5% | 0.6% | 125 | 1% | — | 7.16 | 10,826 |
| I comp. | P | A | 49.4% | 5.5% | 4.7% |  | 27.8% | 11.9% | 0.6% | 125 | 100% | 29% | 1.42 | 4,938 |
| J | E | A | 43.9% | 1.4% | 5.0% |  | 34.4% | 14.8% | 0.6% | 125 | — | — | 3.78 | 7,240 |
| K | E | A | 43.0% | 2.3% | 5.0% |  | 34.4% | 14.8% | 0.6% | 125 | — | — | 3.03 | 5,457 |
| L | E | A | 40.7% | 4.6% | 5.0% |  | 34.4% | 14.8% | 0.6% | 125 | — | — | 2.14 | 5,833 |
| M | E | B | 61.0% | 6.0% | 3.0% | — | 20.5% | 8.8% | 0.7% | 125 | — | — | 1.26 | 6,836 |
| N | F | B | 61.0% | 6.0% | 3.0% | — | 20.5% | 8.8% | 0.7% | 125 | — | — | 1.01 | 4,000 |
| O | F | A | 42.2% | 2.2% | 5.0% |  | 35.2% | 15.1% | 0.6% | 125 | — | — | 3.17 | 6,450 |
| P | F | A | 38.7% | 4.3% |  | 7.0% | 34.6% | 14.8% | 0.6% | 125 | — | — | 2.71 | 7,000 |
| Q | E | A | 43.9% | 1.4% | 5.0% |  | 34.4% | 14.8% | 0.6% | 125 | — | — | 3.05 | 7,311 |
| R | E | A | 42.0% | 2.2% | 5.0% |  | 35.2% | 15.1% | 0.6% | 125 | — | — | 2.21 | 6,368 |
| S | G | A | 40.7% | 4.6% | 5.0% |  | 34.4% | 14.8% | 0.6% | 125 | — | — | 1.58 | 8,278 |
| T | H | A | 42.0% | 2.2% | 5.0% |  | 35.2% | 15.1% | 0.6% | 125 | — | — | 3.70 | 11,741 |
| U | I | A | 42.0% | 2.2% | 5.0% |  | 35.2% | 15.1% | 0.6% | 125 | — | — | 2.74 | 6,240 |
| V | I | A | 40.7% | 4.6% | 5.0% |  | 34.4% | 14.8% | 0.6% | 125 | — | — | 1.70 | 7,350 |
| W | J | A | 40.7% | 4.6% | 5.0% |  | 34.4% | 14.8% | 0.6% | 125 | — | — | 3.01 | 29,500 |
| X comp. | Q | A | 42.9% | 1.3% | 5.0% |  | 35.1% | 15.1% | 0.6% | 125 | — | — | 4.42 | 31,800 |
| Y comp. | Q | A | 42.0% | 2.2% | 5.0% |  | 35.2% | 15.1% | 0.6% | 125 | — | — | 2.09 | 7,014 |
| Z comp. | Q | A | 40.7% | 4.6% | 5.0% |  | 34.4% | 14.8% | 0.6% | 125 | — | — | 2.27 | 7,775 |
| AA comp. | Q | A | 38.9% | 4.3% |  | 7.0% | 34.4% | 14.7% | 0.6% | 120 | — | — | 2.16 | 5,711 |
| AB | L | B | 62.9% | 4.0% | 3.0% |  | 20.6% | 8.8% | 0.6% | 125 | 100% | 100% | 1.52 | 3,750 |
| AC | M | B | 62.9% | 4.0% | 3.0% |  | 20.6% | 8.8% | 0.6% | 125 | 100% | 34% | 1.34 | 3,110 |
| AD | N | B | 62.9% | 4.0% | 3.0% |  | 20.6% | 8.8% | 0.6% | 125 | 100% | 100% | 1.34 | 2,925 |
| AE comp. | P | B | 62.9% | 4.0% | 3.0% |  | 20.6% | 8.8% | 0.6% | 125 | 100% | 30% | 1.10 | 4,250 |

*Organosilicone

Foam Preparation

Slabstock foams were prepared from the stabilized polymer/polyols of this invention using the formulation set forth below

| | |
|---|---|
| Polymer/polyol | variable |
| Polyol | variable |
| Water | 2.3 wt. % |
| Catalyst E | 0.05 wt. % |
| Catalyst G | 0.1 wt. % |
| Surfactant A or B | 0.9 |
| TDI, 110 index | |

The weights of polymer/polyol and polyol always total 100%.

The data relative to the slabstock foams produced is set forth in Table V.

Molded foams were then prepared using various formulations. Their formulations as well as data directed to their performance are set forth in Tables VI and VII.

Foam L shows the improvement in both IFD and Tear relative to comparative Foam M.

Foams DD, EE and FF show the improvement in vent collapse as more of the Polymer/Polyol M is used relative to Foam GG wherein Polymer/Polyol AE is used.

TABLE V

| FOAMS | A | B | C | D | E | F | G | H | I | J | L | Comp. M |
|---|---|---|---|---|---|---|---|---|---|---|---|---|
| Stabilizer | H | E | I | I | I | G | E | F | E | G | G | E-591 |
| Polymer | T | K | U | U | V | W | K | O | L | R | P(MeOH) | AA |
| Polyol | | | | | | | | | | | | |
| Foam Formulation | | | | | | | | | | | | |
| Wt. polymer polyol/ | 86.1/ | 85.6/ | 85.4/ | 85.4/ | 82.7/ | 86.7/ | 85.6/ | 82.8/ | 85.1/ | 85.8/ | 83.5/ | 84.2/ |
| Polyol E | 13.9 | 14.4 | 14.6 | 14.6 | 17.3 | 13.3 | 14.4 | 17.2 | 14.9 | 14.2 | 16.5 | 15.8 |
| Foam Properties | | | | | | | | | | | | |
| Rise Time | 147 | 140 | 134 | 135 | 136 | 134 | 140 | 138 | 140 | 136 | 135 | 143 |
| Density | 2.48 | 2.47 | 2.45 | 2.48 | 2.49 | 2.5 | 2.47 | 2.48 | 2.47 | 2.46 | 2.49 | 2.46 |
| Porosity | 37.4 | 32 | 29.3 | 29.3 | 26.6 | 29.3 | 32 | 34.7 | 26.6 | 26.6 | 26.6 | 32 |
| IFD, 25% | 85.5 | 93.8 | 88.8 | 87.7 | 94.5 | 90.8 | 93.8 | 91.5 | 90.8 | 92.8 | 94.8 | 89.3 |
| 65% | 159.8 | 166.6 | 164.5 | 164.8 | 171.5 | 171.2 | 166.8 | 167.5 | 163.5 | 167.2 | 173.3 | 160.5 |
| 65/25 | 1.87 | 1.78 | 1.85 | 1.88 | 1.81 | 1.89 | 1.78 | 1.83 | 1.8 | 1.8 | 1.83 | 1.8 |
| CFD, 25% | 1.52 | 1.49 | 1.52 | 1.5 | 1.61 | 1.58 | 1.49 | 1.51 | 1.52 | 1.61 | 1.59 | 1.49 |
| Tensile | 20.7 | 22.4 | 20.2 | 2.08 | 25.6 | 19.7 | 22.4 | 25.7 | 22.5 | 23.2 | 30.2 | 27.6 |
| Elongation | 52.3 | 50.7 | 45 | 46.6 | 62.3 | 46.5 | 50.7 | 60.8 | 56.5 | 55 | 76.8 | 73.9 |
| Tear | 1.0 | 1.0 | 1.1 | 1.2 | 1.2 | 1.3 | 1.0 | 1.6 | 1.4 | 1.3 | 2.6 | 2.1 |
| Comp. set, 90% | | | | | | | | | | | | |
| Fatigue | | | | | | | | | | | | |
| 25% loss | 48.0 | 47.8 | 46.0 | 42.5 | 44.0 | 43.3 | 47.8 | 43.1 | 41.0 | 46.9 | 41.6 | 40.3 |
| 65% loss | 53.8 | 54.1 | 51.3 | 48.2 | 49.5 | 49.3 | 54.1 | 49.5 | 47.2 | 51.4 | 43.5 | 46.3 |
| Avg loss | 50.9 | 51.0 | 48.6 | 45.3 | 46.8 | 46.3 | 51.0 | 46.3 | 44.1 | 49.1 | 42.5 | 43.3 |
| Fatigue Ratio | 33.5 | 34.2 | 32 | 30.2 | 29 | 29.3 | 34.2 | 30.7 | 29 | 30.58 | 26.7 | 29 |

TABLE VI

HR FOAMS FROM SILICONE-STABILIZER POLYOLS

| | P | Q | S | T | X | Y | Z | AA | BB |
|---|---|---|---|---|---|---|---|---|---|
| FOAM FORMULATION | | | | | | | | | |
| Polymer Polyol M | 32 | 32 | 32 | 16 | 24 | 32 | 32 | 32 | 32 |
| Polymer Polyol AE | — | — | — | 16 | 10 | — | — | — | — |
| Polyol B | 68 | 68 | 68 | 68 | 66 | 68 | 68 | 68 | 68 |
| Water | 4 | 4 | 3.1 | 3.1 | 4.5 | 4.5 | 4.5 | 4.5 | 4.5 |
| Diethanol amine | 1.5 | — | — | — | — | 1.5 | = | 0.5 | = |
| Catalyst F | 0.24 | — | — | — | — | — | — | — | — |
| Catalyst A | — | — | — | — | 0.3 | 0.3 | 0.3 | 0.3 | 0.3 |
| Catalyst E | — | 0.1 | 0.1 | 0.01 | — | — | — | — | 0.1 |
| Catalyst B | 0.2 | — | — | — | 0.23 | 0.23 | 0.23 | 0.23 | 0.23 |
| Catalyst H | — | 0.6 | 0.6 | 0.6 | — | — | — | — | — |
| Catalyst C | — | — | — | — | 0.25 | 0.25 | 0.25 | 0.25 | 0.25 |
| Catalyst D | 0.01 | 0.01 | 0.01 | 0.01 | 0.01 | 0.01 | 0.01 | 0.01 | 0.01 |
| Surfactant A | — | — | — | — | — | 1.5 | 0.5 | 0.5 | — |
| TDI Index | 105 | 105 | 105 | 105 | 100 | 100 | 100 | 100 | 100 |
| FOAM | | | | | | | | | |
| Density | 1.96 | 2.04 | 2.32 | 2.33 | collapse | foam OK | foam OK | foam OK | foam OK |
| Resiliency | 65 | 38 | 36 | 50 | | | | | |
| Porosity | 10.8 | 2.78 | 3.18 | 5.2 | | | | | |
| IFD, 25 | 36 | 45.7 | 46 | 47.5 | | | | | |
| IFD, 65 | 99.7 | 115.7 | | 113.2 | | | | | |
| 65/25 | 2.77 | 2.53 | 2.46 | 2.34 | | | | | |
| Tensile | 19.9 | 24.8 | 24 | 22.7 | | | | | |
| Elongation | 105.5 | 131.1 | 140 | 153 | | | | | |
| Tear | 1.1 | 1.72 | 1.82 | 1.81 | | | | | |

TABLE VII

| Foam | CC | DD | EE | FF | GG |
|---|---|---|---|---|---|
| FORMULATION | | | | | |
| Polyol B | 65.9 | 65.9 | 63.8 | 61.9 | 60 |
| Polymer Polyol AE | 10 | 10 | 20 | 30 | 40 |
| Polymer Polyol M | 24.1 | 24.1 | 16.2 | 8.1 | — |
| Water | 4.5 | 4.5 | 4.5 | 4.5 | 4.5 |
| Diethanol amine | — | 1.25 | 1.25 | 1.25 | 1.25 |
| Catalyst A | 0.3 | 0.3 | 0.3 | 0.3 | 0.3 |
| Catalyst B | 0.23 | 0.23 | 0.23 | 0.23 | 0.23 |
| Catalyst F | 0.25 | 0.25 | 0.25 | 0.25 | 0.25 |
| Catalyst D | 0.01 | 0.01 | 0.01 | 0.01 | 0.01 |
| Surfactant A | | 1.5 | 1.5 | 1.5 | 1.5 |
| TDI Index | | | | | |
| FTC-1 | collapse | 482 | 397 | 419 | 388 |
| 2 | | 360 | 230 | 263 | 220 |
| 3 | | 277 | 169 | 173 | 138 |
| Vent Collapse | | 0 | 0 | 0.5 | 7.6 |

We claim:

1. A polymer/polyol stabilizer of the general formula

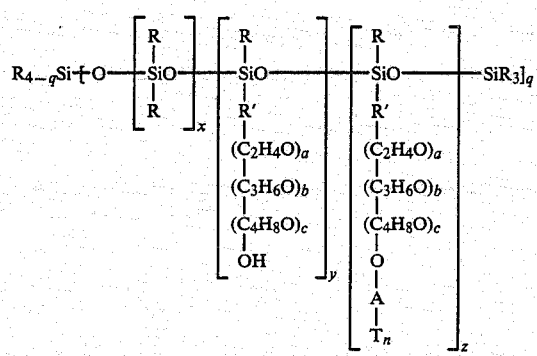

wherein R is an alkyl group having from 1 to about 4 carbon atoms; R' is an alkylene group having from 3 to 6 carbon atoms; a is an integer having a value of from 0 to about 100; b is an integer having a value of from 0 to about 100; c is an integer having a value of from 0 to about 100; the sum of a+b+c is at least 5; the values of a, b and c may be the same or different within y and z groups; g is an integer having a value of from 0 to 3; x is an integer having a value of from 0 to about 200; z has a value of from about 0.2 to about 3.0; y+z has a value of from about 3 to about 50; A is a reactive unsaturated group, T is an alkylene oxide group, and n is an integer having a value of from 0 to about 3.

2. The composition of claim 1 wherein A comprises a compound having alpha, beta unsaturation.

3. The composition of claim 1 wherein A is selected from the group consisting of maleate, fumarate, alkyl fumarate, alkyl maleate, acrylate, and methacrylate.

4. The composition of claim 1 wherein A is selected from the group consisting of maleate and fumarate.

5. The composition of claim 1 wherein x is an integer having a value of from 0 to about 40 and y+z has a value of from about 5 to about 25.

6. The composition of claim 1 wherein a is an integer having a value of from about 3 to about 10 and b is an integer having a value of from about 10 to about 40.

7. The composition of claim 1 wherein T is selected from the group consisting of ethylene oxide, propylene oxide and mixtures thereof and n is an integer having a value of from about 0 to about 2.

8. The composition of claim 1 wherein R is a methyl group and R' is an alkylene group having from 3 to 4 carbon atoms.

9. The composition of claim 1 wherein R is a methyl group, R' is an alkylene group having 3 carbon atoms; a is an integer having a value of from about 3 to about 10; b is an integer having a value of from about 10 to about 40; g is 1; x is an integer having a value of from 0 to about 20; y+z has a value of from about 5 to about 25; z has a value of from about 0.5 to about 1.5; A is selected from the group consisting of maleate and fumarate groups, T is selected from the group consisting of ethylene oxide, propylene oxide and mixtures thereof and n is an integer having a value of from 0 to 2.

* * * * *